(12) United States Patent
Lin et al.

(10) Patent No.: US 7,383,737 B1
(45) Date of Patent: Jun. 10, 2008

(54) CAPACITIVE PRESSURE SENSOR

(75) Inventors: Yingjie Lin, El Paso, TX (US); Carlos A. Urquidi, Juarez (MX); Francisco Romo, Juarez (MX)

(73) Assignee: Delphi Technologies, Inc, Troy, MI (US)

( * ) Notice: Subject to any disclaimer, the term of this patent is extended or adjusted under 35 U.S.C. 154(b) by 0 days.

(21) Appl. No.: 11/693,202

(22) Filed: Mar. 29, 2007

(51) Int. Cl.
*G01L 9/12* (2006.01)
(52) U.S. Cl. .......................... 73/718; 73/724
(58) Field of Classification Search .................. 73/718, 73/724
See application file for complete search history.

(56) References Cited

U.S. PATENT DOCUMENTS

| | | | |
|---|---|---|---|
| 4,204,244 A | 5/1980 | Ho | |
| 4,388,668 A | 6/1983 | Bell et al. | |
| 4,617,607 A | 10/1986 | Park et al. | |
| 5,329,819 A | 7/1994 | Park et al. | |
| 5,656,780 A * | 8/1997 | Park | 73/724 |
| 6,272,927 B1 * | 8/2001 | Amatruda et al. | 73/718 |
| 6,374,679 B1 * | 4/2002 | Babala et al. | 73/715 |
| 6,487,911 B1 | 12/2002 | Frackelton et al. | |
| 6,647,795 B2 * | 11/2003 | Suzuki et al. | 73/718 |
| 6,781,814 B1 | 8/2004 | Greene | |
| 7,284,444 B2 * | 10/2007 | Kurtz et al. | 73/777 |
| 7,316,163 B2 * | 1/2008 | Grudzien | 73/718 |
| 2006/0162461 A1 | 7/2006 | Amore et al. | |

* cited by examiner

*Primary Examiner*—Andre J Allen
(74) *Attorney, Agent, or Firm*—Paul L. Marshall

(57) ABSTRACT

A capacitive pressure sensor includes a electrically conductive, generally piston shaped diaphragm with a flexible base wall configured to deflect under pressure. The diaphragm is generally U-shaped in cross section. The base wall includes an upper, flat sensing surface which acts as a capacitive electrode. The diaphragm further includes a step around a radially-outermost perimeter which is elevated from the flat sensing surface. A sensing electrode body is located on top of the step and creates a capacitive sensing cavity between the sensing surface and the bottom surface of the electrode body. On the bottom surface of the electrode body is formed a center, circular electrode and a ring electrode that surrounds the center electrode. The center electrode and the sensing surface form a variable capacitor which changes with pressure and the ring electrode and the sensing surface form a reference capacitor. A circuit determines a differential capacitance between the variable capacitor and the reference capacitor and generates a pressure signal indicative of the fluid pressure applied to the diaphragm. A spring ring holds the sensing electrode body against the diaphragm when assembled. The diaphragm can be a machined metal part or a sheet metal cup. The sensing electrodes and signal generating circuit can take the form of a hybrid circuit.

25 Claims, 10 Drawing Sheets

CAPACITIVE PRESSURE SENSOR

TECHNICAL FIELD

The invention relates in general to sensors, and more particularly, to a capacitive pressure sensor.

BACKGROUND OF THE INVENTION

In the automotive industry, it is frequently necessary to know the pneumatic or hydraulic pressure in a container or along a pressure line. Current technologies for pressure measurement sensors include piezoresistive technology implemented using thick film, thin film and MEMS, which involve, for example, building a strain gage on the top surface of a sensing membrane.

Additionally, it is known to employ capacitive technology, for example on MEMS and/or discrete membranes, as seen by reference to U.S. Pat. No. 5,656,780 entitled CAPACITIVE PRESSURE TRANSDUCER WITH AN INTEGRALLY FORMED FRONT HOUSING AND FLEXIBLE DIAPHRAGM issued to Park ("Park"). Park discloses a pressure transducer that includes a reference capacitor electrode and a variable capacitor electrode, both of which are electrically connected to a circuit. The variable capacitor electrode and a conductive surface of a diaphragm form a variable capacitor whose capacitance varies with changes in a fluid pressure in a transducer chamber. The design disclosed in Park, however, is rather complicated and includes an increased number of parts. Generally, the conventional art of capacitive sensing requires elaborate manufacturing processes and an increased number of parts to assemble the sensing element. Moreover, these sensors also have a shortcoming insofar as not being able to effectively seal high pressures. In addition, conventional sensing membranes are generally not compatible with a wide range of media (i.e., the fluid whose pressure is being sensed).

There is therefore a need for a sensor that minimizes or eliminates the shortcomings as set forth above.

SUMMARY OF THE INVENTION

A sensor in accordance with this invention provides a configuration that permits a simplified manufacturing and assembly process, overcoming the complicated and complex manufacturing process described in the Background. Additionally, embodiments of the present invention provide a configuration with a reduced number of parts—fewer parts that can fail thereby improving reliability. Additionally, the simplified configuration provides for a less expensive sensor. Further, a sensor according to the present invention embodies a mechanization that provides for greater flexibility is constructing the sensing diaphragm for different pressure ranges, media compatibility and material selection, all of which improve the cost effectiveness of the sensor.

A pressure sensor according to the invention includes a base-port, a transducer having a diaphragm and a sensing electrode body, and a pressure signal generating circuit. The base-port includes an opening configured to receive a fluid having a pressure to be measured. The diaphragm is made from electrically conductive material and has a base wall extending into a cylindrical, closed side wall which defines an interior of the diaphragm. The diaphragm is characterized by a piston shape, which has an inverted U-shape in cross-section. The diaphragm is arranged relative to the base-port such that the interior is in fluid communication with the fluid opening of the base-port to thereby form a fluid pressure cavity. The base wall of the diaphragm has a working surface facing the fluid pressure cavity and an opposing, flat sensing surface.

The sensing electrode body includes an insulating substrate (e.g., ceramic) having a center electrode and a ring electrode both facing toward but spaced apart from the sensing surface of the diaphragm by a spacer to form an air gap therebetween. The center electrode and the sensing surface form a first capacitor and the ring electrode and the sensing surface form a second capacitor. Changes in pressure in the fluid pressure cavity principally result in variations in the capacitance of the first capacitor, with perhaps some variation in the second capacitor. Finally, the pressure signal generating circuit is responsive to variations in the capacitance of the first and second capacitors, preferably measured in a differential mode, to generate a pressure signal indicative of the fluid pressure.

Other embodiments are presented, including those where the spacer comprises a step ring or an integral step on the diaphragm surface.

BRIEF DESCRIPTION OF THE DRAWINGS

The present invention will now be described by way of example, with reference to the accompanying drawings.

DETAILED DESCRIPTION OF THE PREFERRED EMBODIMENTS

Figure 1:
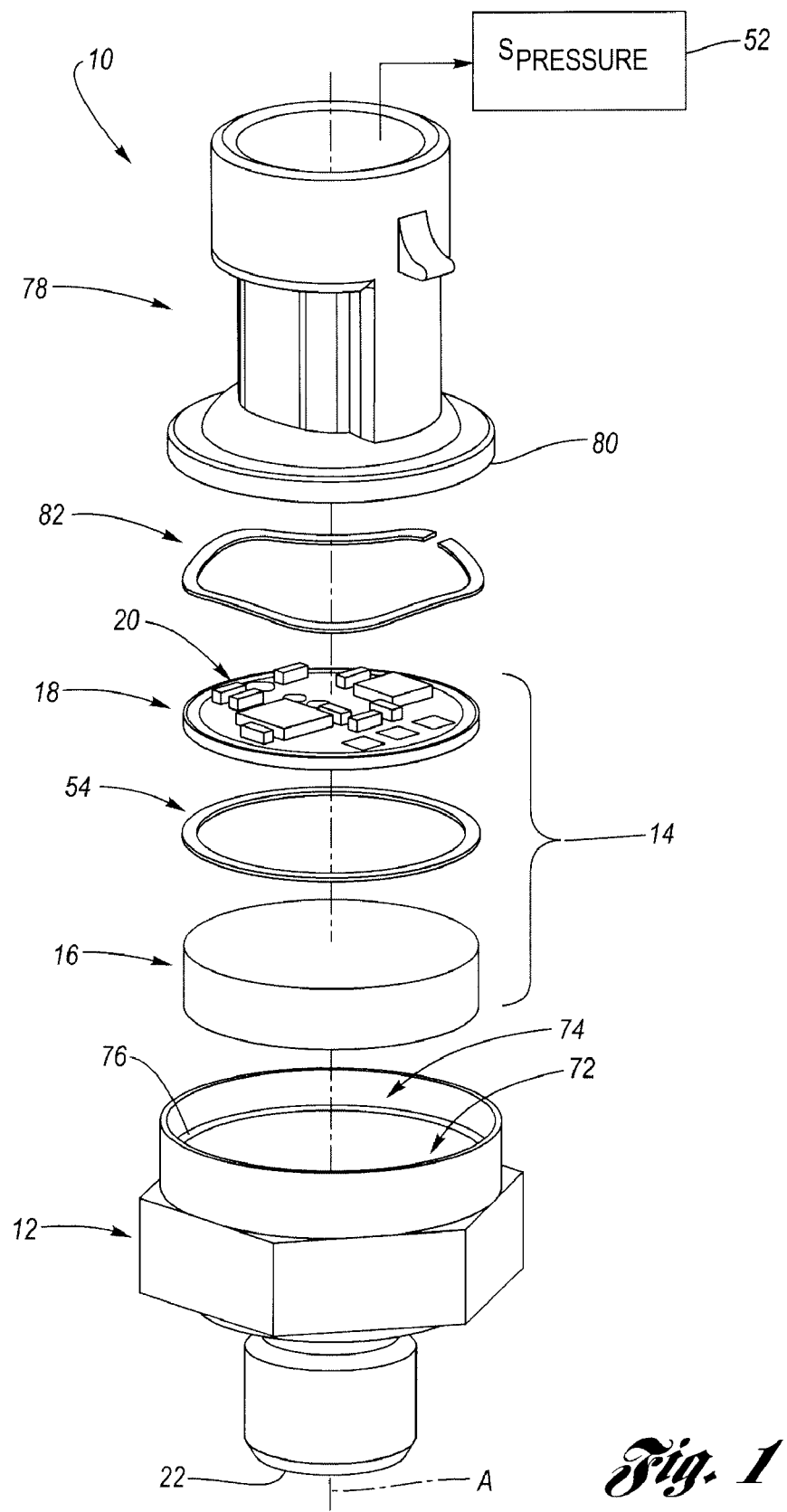
FIG. 1 is an exploded view of the inventive capacitive pressure sensor in an unassembled state.

FIG. 1 shows a capacitive pressure sensor 10 in accordance with the present invention in an exploded, non-assembled state. Sensor 10 is formed of a plurality of components which, when assembled, fit together in a concentrically aligned manner along a main longitudinal axis, designated axis "A" in FIG. 1. Sensor 10 includes a base-port 12, a transducer 14 having (i) a diaphragm 16 and a (ii) sensing electrode body 18, and a pressure signal generating circuit 20. The invention features a sensor with a configuration having a reduced number of parts, which improves cost effectiveness and decreases the complexity of manufacturing.

Figure 2:
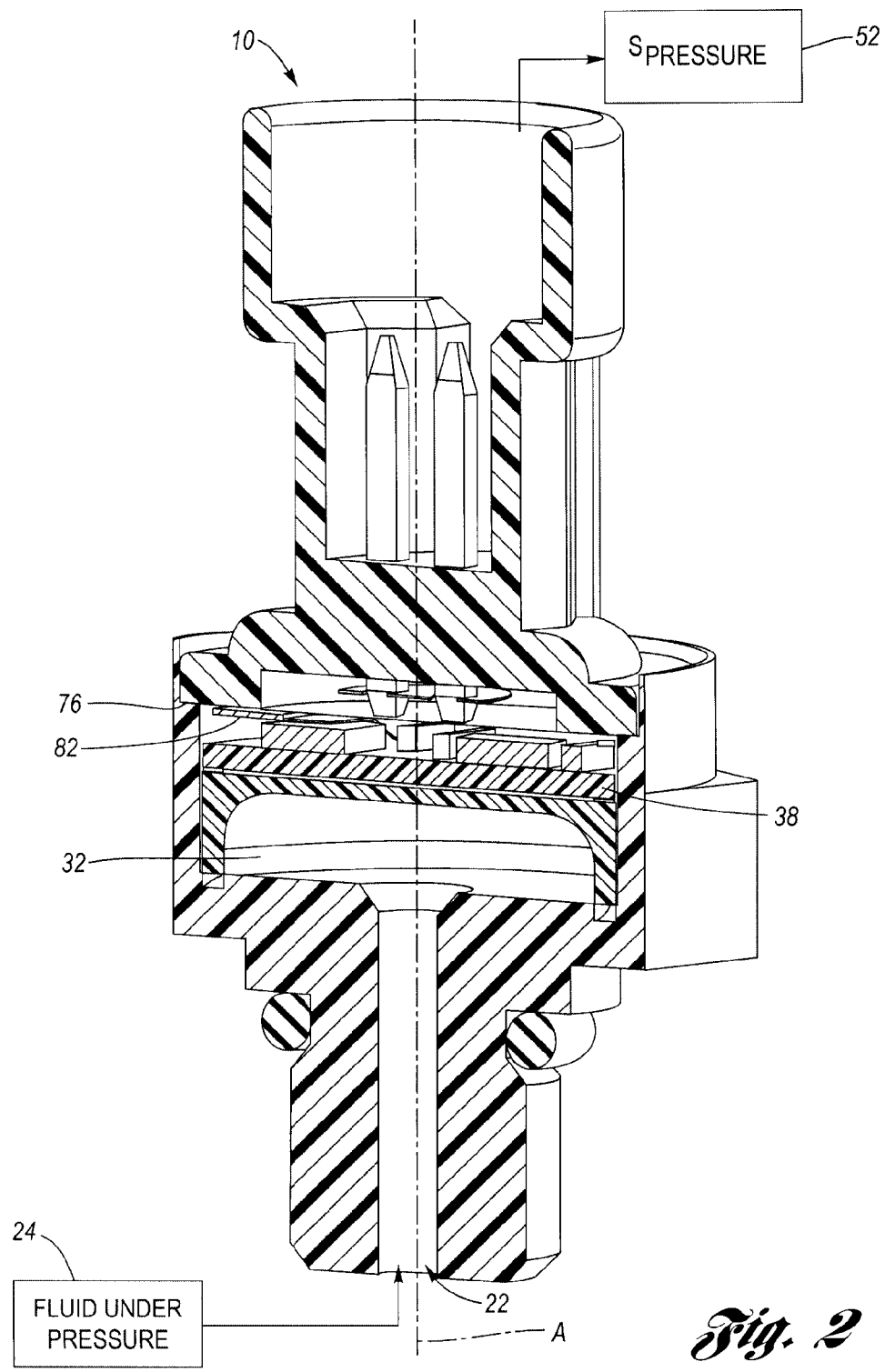
FIG. 2 is a partial, cross-sectional view of the sensor of FIG. 1 in an assembled state.

FIG. 2 is a cross-sectional view of sensor 10 in an assembled state, which illustrates the axial compactness of the assembly. From an operational point of view, base port 12 has an opening 22 configured to receive a fluid, designated by block 24, under pressure having a value that may vary over time. This is the "input." The sensor 10, more specifically circuit 20, produces an output in the form of a pressure signal 52 ($S_{PRESSURE}$) indicative of the pressure of the fluid 24.

With reference to FIGS. 1 and 2, base-port 12 is configured to be the base structure into which other components can be assembled. Transducer 14 is configured such that its capacitance characteristics vary as a function of the applied pressure of fluid 24. Finally, circuit 20 is configured to measure the variations in capacitance characteristics of transducer 14 and generate the output signal 52 ($S_{PRESSURE}$) indicative of the pressure of fluid 24.

The base-port 12 may be fabricated using materials known in the art, for example, stainless steel or the like. Additionally, base-port 12 may include an integrally formed hexagonal nut or the like (best shown in FIG. 1) to facilitate installation of the completely assembled sensor 10.

Figure 3:
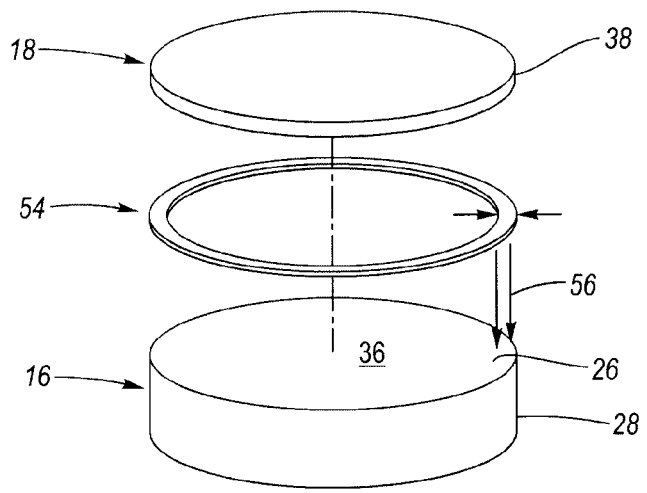
FIG. 3 shows, in greater detail, a sensing electrode body portion of FIG. 1.

FIG. 3 is a perspective view showing transducer 14 in greater detail. Diaphragm 16 of transducer 14 includes a base wall 26 extending into a cylindrical, closed sidewall 28. Diaphragm 16 may be formed of electrically-conductive material, such as stainless steel, and is electrically connected to circuit 20, in a manner more fully described below.

Figure 4A:
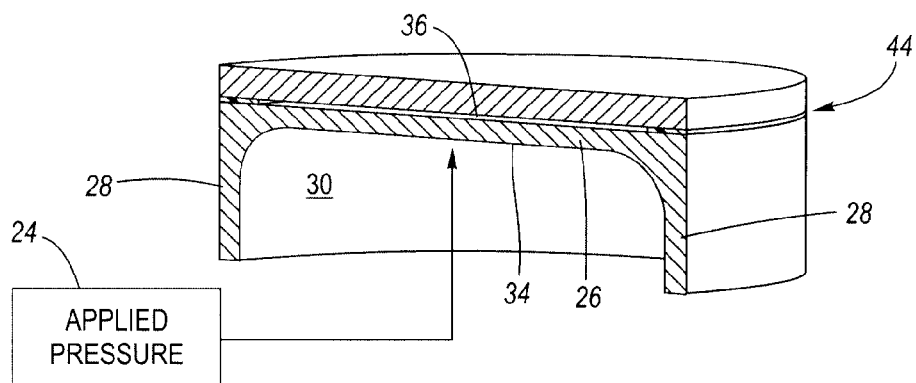
FIGS. 4A-4C are cross-sectional views of the diaphragm and sensing electrode body in an assembled state.

FIG. 4A is a cross-sectional view of the transducer 14, including diaphragm 16 and sensing electrode body 18. As shown, the base wall 26 described above that extends into the closed sidewall 28 defines an interior 30. When assembled, diaphragm 16 is arranged relative to base-port 12 such that interior 30 of the diaphragm is in fluid communication with fluid opening 22 to thereby form a fluid pressure cavity 32 (best shown in FIG. 2). Diaphragm 16 is generally piston shaped, and approximates an inverted U-shape in cross-section. Base wall 26 of diaphragm 16 has a working surface 34 and an opposing, flat sensing surface 36. Working surface 34 is configured to face fluid pressure cavity 32 and is the surface against which the fluid pressure acts.

With reference to FIG. 2, when diaphragm 16 is disposed in base-port 12, it is attached to base-port 12 so that fluid pressure cavity 32 can withstand the expected working range of pressure from fluid pressure 24. For example, diaphragm 16 may be attached to base-port 12 using deformation resistance welding, or in an alternate embodiment, laser welding, to achieve the mechanical attachment and hermetic seal that is needed. It should be understood that there are a wide variety of attachment approaches that may be employed and meet the foregoing requirements.

Figure 5:
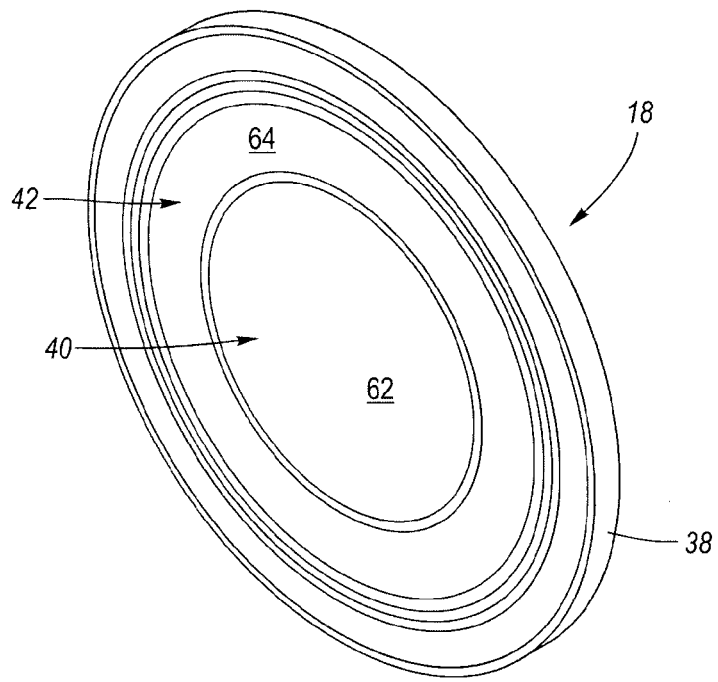
FIG. 5 is a perspective view of the sensing electrode body of FIG. 1, showing the center and ring electrodes.

FIG. 5 is a perspective view of a bottom surface of sensing electrode body 18. Sensing electrode body 18 includes an insulating substrate 38 having an electrically conductive center electrode 40 and an electrically conductive ring electrode 42. In a preferred embodiment, the insulating substrate 38 may comprise ceramic material, which provides good dimensional stability throughout and over a predetermined operating temperature range. Additionally, ceramic provides an increased resistance to and therefore exhibits less surface deflection due to stresses that may come to bear on substrate 38 during the operating life of sensor 10. Center electrode 40 and ring electrode 42 may be formed on substrate 38 according to conventional practices known in the art. In a preferred embodiment, electrodes 40, 42 are formed by applying conductive inks printed over the surface of ceramic substrate 38 (i.e., thick film technology). As shown, ring electrode 42 surrounds the circular-shaped center electrode 40. Additionally, each of the electrodes 40, 42 are also electrically connected to circuit 20, preferably, for example, through vias (not shown) formed through the insulating substrate 38. The circuit 20 is located on the other side of the substrate, as described below.

The center electrode 40 and the ring electrode 42 face toward and are spaced apart from the sensing surface 36 of diaphragm 16 by a spacer 44 (shown in FIG. 4A). This spacing forms an air gap 46 (shown in FIG. 4B) between the electrodes 40, 42 and sensing surface 36. As will be described below, the present invention discloses alternate embodiments to achieve spacer 44, shown respectively in FIG. 4B (a separate step ring) and FIG. 4C (an integral step). The underlying principle of capacitive sensing involves modulating a capacitance in accordance with a pressure where the value of the modulated capacitance is indicative of the pressure. Here, for such purpose, it should be appreciated that the spaced electrodes form a capacitor, and in this regard, circular, center electrode 40 and sensing surface 36 form a first capacitor 48 (schematically shown in FIG. 7) while ring electrode 42 and sensing surface 36 form a second capacitor 50 (also shown schematically in FIG. 7).

Figure 4B:
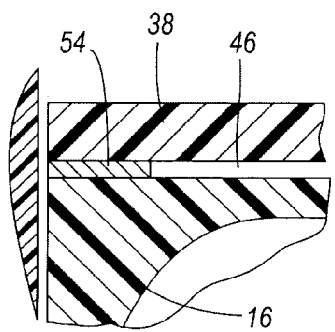

In FIG. 4B, spacer 44 takes the form of a step ring 54 sandwiched between diaphragm 16 and insulating substrate 38. The step ring 54 is configured in size and shape to overlay a radially-outermost perimeter surface 56 of diaphragm 16 (best shown in FIG. 3). This feature is adapted to prevent interference of the spacer 44 with the electrodes and provides for the formation of air gap 46.

Figure 4C:
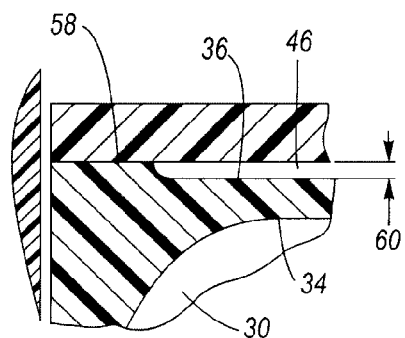

In FIG. 4C, spacer 44 takes the form of a step 58 that is integrally formed in the top surface of diaphragm 16. Step 58 is offset from sensing surface 36 by a predetermined distance 60 forming air gap 46. Step 58 is also configured to occupy a radially-outermost perimeter of the top surface of diaphragm 16.

With continued reference to FIG. 4A, aligning and stacking up diaphragm 16, spacer 44, and sensing electrode body 18 forms capacitive transducer 14. Transducer 14 is arranged relative to the other components of sensor 10 so that under zero pressure in the fluid pressure cavity 32, air gap 46 will be bounded by substantially parallel surfaces, namely, one from the flat sensing surface 36 of diaphragm 16 and one from the electrode surface (e.g., electrodes 40, 42) of sensing electrode body 18. Air gap 46 will be substantially constant under zero pressure and dictated by the thickness of spacer 44 (either step ring 54 or integral step 58).

As shown in FIG. 5, two electrodes 40, 42 on the surface of insulating substrate 38 are formed of electrically conductive material that cooperate with sensing surface 36 to form first and second capacitors 48, 50. Center electrode 40 is configured to have a first area 62 while the ring electrode 42 is configured to have a second area 64. In a preferred embodiment, first and second areas 62, 64 are selected to be substantially equal. Accordingly, first and second capacitors 48, 50 in the illustrated embodiment will also have substantially the same capacitance value under zero applied pressure.

Figure 6:
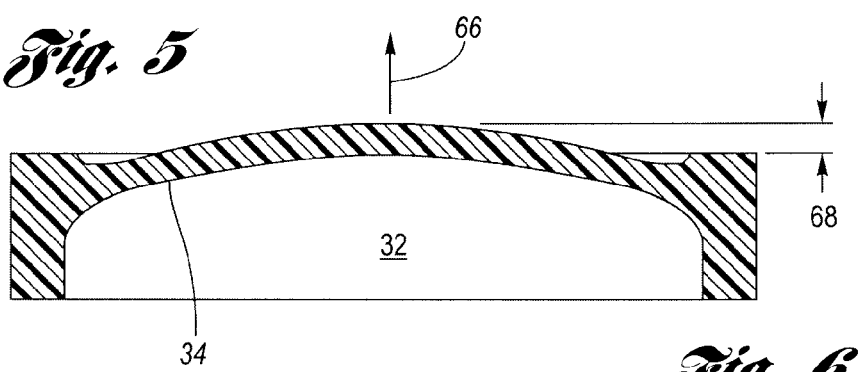
FIG. 6 is a cross-sectional view of the diaphragm of FIG. 1, shown during application of a fluid pressure resulting in a deflection.

Referring to FIG. 6, when fluid under pressure enters fluid pressure cavity 32, such pressurized fluid bears against working surface 34 of diaphragm 16. It should be understood that the foregoing pressure may be either pneumatic or hydraulic in nature. In response, diaphragm 16 (specifically the base wall 26) will deform substantially in the direction of arrow 66 by a deflection amount 68 whose value is dependent on the applied pressure, design of diaphragm 16, etc. The elastic deformation of diaphragm 16 will decrease the separation distance between center electrode 40 and sensing surface 36, thereby altering the capacitance of first capacitor 50. This change in capacitance can be picked up by an electrical circuit, such as circuit 20 as described below.

Figure 7:
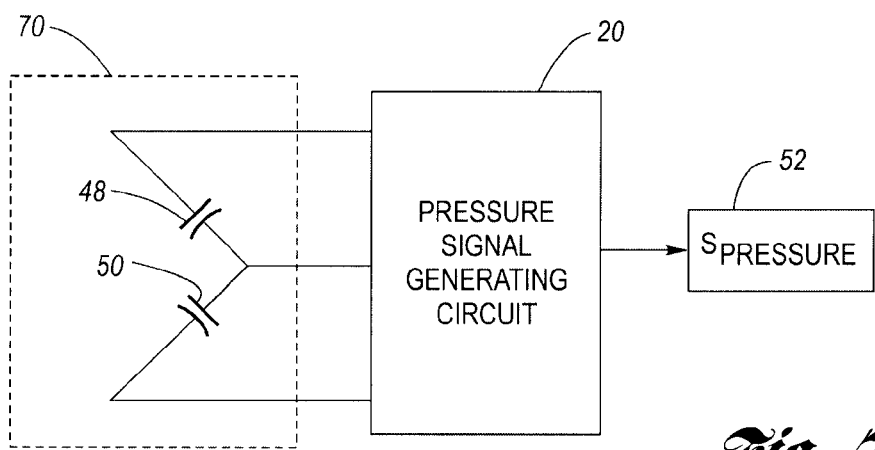
FIG. 7 is a simplified circuit diagram of the sensor of FIG. 1 showing a half-bridge arrangement for determining a differential capacitance.

FIG. 7 is an electrical schematic diagram of sensor 10. Preferably, first and second capacitors 48, 50 are arranged with respect to each other and connected to pressure signal generating circuit 20 so as to allow measurement of the respective capacitance values in a differential mode. That is, in a differential measuring mode, under zero applied pressure (i.e., with no fluid pressure in pressure sensing cavity 32), circuit 20 should detect approximately zero differential capacitance between first capacitor 48 and second capacitor 50. This is owing in part to the fact that the center and ring electrodes 40, 42 are configured to have equal areas, and hence equal capacitances under zero applied pressure. Circuit 20 is coupled to and is responsive to variations in the capacitance of first and second capacitors 48, 50, specifically the differential capacitance, and is configured to generate a pressure signal 52 ($S_{PRESSURE}$) indicative of the sensed fluid pressure. Circuitry for detecting and processing such differential capacitance is known in the art.

FIG. 7 specifically illustrates that first and second capacitors 48, 50 are connected in a half-bridge arrangement 70 to ascertain the differential capacitance. Preferably, half-bridge 70 will employ the second (ring) capacitor 50 as a constant, reference capacitor, with the first (center) capacitor 48 as a variable capacitor whose capacitance value varies based on changes in the applied fluid pressure. One advantage of half-bridge 70 is that such a configuration is adapted to minimize or eliminate the adverse impact (variability) of some of the mechanical, electrical and temperature dependent variables. For example, dimensional changes that occur due to temperature changes may be expected to affect both capacitances in substantially equal amounts, and thus cancel each other out when sensed in a differential mode.

Since the deformation of sensing surface 36 is in the form of a dome (i.e., center having the greatest deformation), the largest changes in capacitance will be expressed in the changed capacitance of first capacitor 48 (center electrode), while a much smaller change in capacitance will be measured on the second capacitor 50 (ring electrode). The differential capacitance approach exhibits good sensitivity with respect to changes in applied pressure.

With continued reference to FIG. 1, base-port 12 further includes a well 72 in fluid communication with opening 22, which is configured to receive transducer 14. The base-port 12 still further includes a mouth 74 that is axially opposite opening 22 and provides a means for gaining access to well 72. Base-port 12 also includes an annular mounting shoulder 76 in well 72. On the top end of sensor 10, a housing and connector assembly 78 is provided which includes a closure flange 80. Closure flange 80 is configured in size and shape to pass through mouth 72 of base-port 12 and to engage and be seated against annular mounting shoulder 76. FIG. 1 also shows a spring ring 82, whose function will be described below. The transducer 14 including diaphragm 16, spacer 44, and sensing electrode body 18, circuit 20, spring ring 82, and housing and connector assembly 78, are all concentrically aligned relative to axis "A" and are inserted into well 72 to form sensor 10. The well 72 acts as a mechanism to ensure axial alignment. Closure flange 80 acts to close and retain the foregoing components in well 72.

The deformation of diaphragm 16 is designed to behave according to specific requirements of the contemplated use, for example, the desired working pressure range, overpressure requirements, and media compatibility. The configuration of the present invention permits these and other requirements to be handily satisfied through appropriate material properties selection, among other criteria. Diaphragm 16 according to the invention, for example, may be designed based on finite element analysis (FEA) under stress/deflection criteria, as shown generally in FIGS. 8 and 9.

Figure 8:
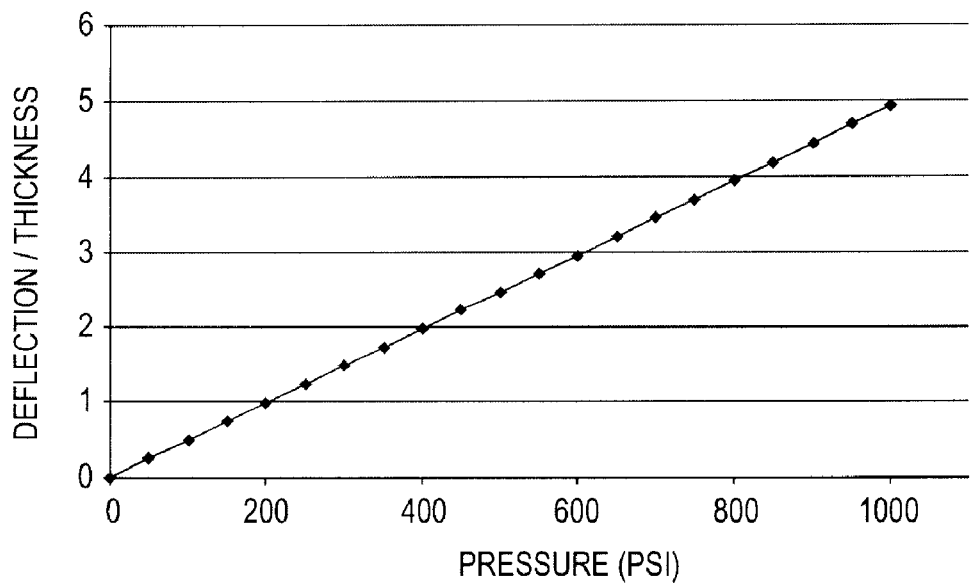
FIG. 8 is a deflection ratio versus pressure diagram corresponding to one embodiment of the present invention.

FIG. 8, for example, illustrates a trace describing the deflection ratio-versus-pressure characteristics as per a finite element analysis (FEA) for a particular embodiment.

Figure 9:
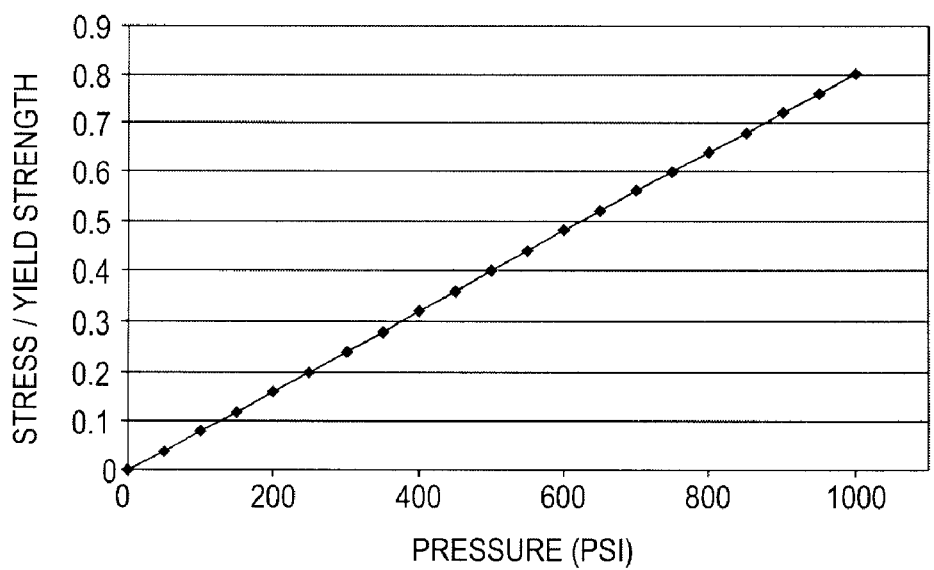
FIG. 9 is stress ratio versus pressure diagram corresponding to one embodiment of the present invention.

FIG. 9, for example, illustrates a trace describing the stress ratio-versus-pressure characteristics as per a finite element analysis (FEA) for a particular embodiment.

It should be noted that the dome deformation (described above) of sensing surface 36 does not yield a linear capacitance variation (i.e., linear as a function of applied pressure) of either capacitors 48, 50, or both of them in differential mode. Although the end measurement of differential capacitance is not linear, it can be characterized to follow, for example, a second order equation. However, circuit 20 may accordingly be configured so that the overall response of sensor 10, as a function of applied pressure, is linear, for example, to satisfy sensor linearity requirements.

Figure 10:
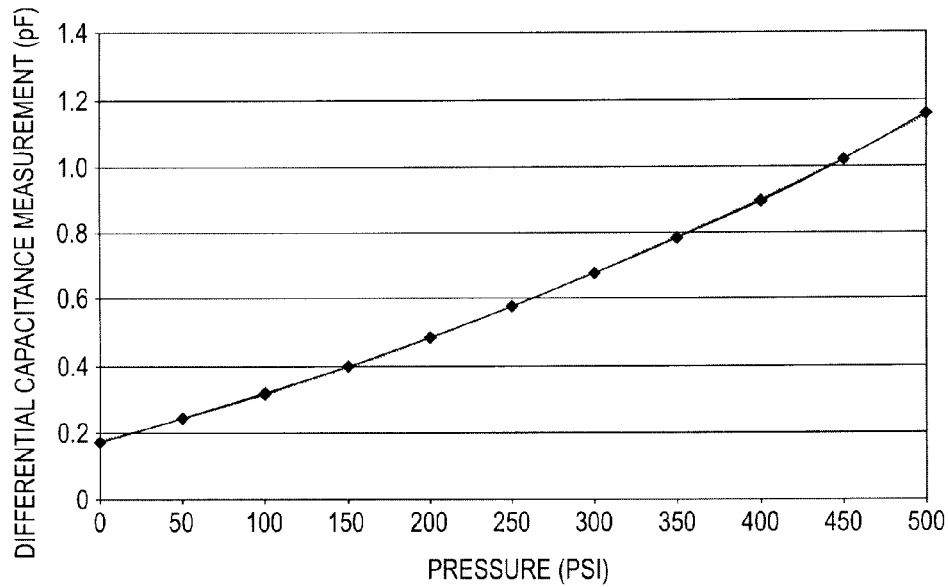
FIG. 10 is a measured differential capacitance versus applied pressure diagram corresponding to the operation of one embodiment of the present invention.

In this regard, FIG. 10 is a differential, measured capacitance versus pressure plot showing results from a constructed embodiment having a sensing element 21 mm in diameter. Note the non-linear relationship produced by the dome-shaped deflection, as described above.

Sensor 10 provides a structure with improved robustness or in other words tolerance to changes in a couple of key areas: (i) axial and radial movements and (ii) thermal effects. First, axial and radial movement of the transducer will have minimal if any effect on the differential capacitance (and thus pressure) measurements so long as the air gap between the center and ring electrodes 40, 42 and the sensing surface 36 does not change. This is due to the concentric abutting arrangement of the diaphragm 16, spacer 44 and sensing electrode body 18, forming transducer 14. Second, since the measurement of the capacitance is made in a differential mode (i.e., half bridge configuration) changes in the air gap due to material thermal expansion (and/or changes in the dielectric constant of any dielectric material disposed in the gap) will have a reduced impact on performance of sensor 10.

In addition to the simplified arrangement of the base-port, transducer and signal generating circuit, sensor 10 further includes other inventive features one of which is configured to hold the components of transducer 14 together and in place as a unit when assembled into well 72. Specifically, sensing electrode body 18 must be aligned with and tightly positioned against diaphragm 16 to establish spaced-apart electrodes to define capacitors, as described above (i.e., face-to-face contact of sensing electrodes to diaphragm to define the capacitive sensing cavity).

In accordance with another feature of the invention, spring ring 82, or alternatively a spring washer, may be used to maintain sensor 10 as an axially compact assembly through efficient use of axial space, but that also maintains a sufficient axially-applied force to hold sensing electrode body 18 in place against diaphragm 16 (i.e., face-to-face contact). Additionally, variations in dimensional (axial) stack up, for example, due to part-to-part manufacturing variations of the plastic housing and connector assembly 78, variations in the thickness of insulating substrate 38, variations in the diaphragm 16 and base-port 12, as well as variations arising from the joining method of the diaphragm to the base-port, all will not have a material affect on the performance of sensor 10 because such axial variations will be accommodated by and absorbed by the axial compression force of spring ring 82. Moreover, dimensional changes due to thermal expansion and/or external stresses on the plastic connector housing 78 are also absorbed by spring ring 82.

Spring ring 82 may be made from stainless steel metal or the like. Spring ring 82 is especially configured in size and shape to achieve a predetermined spring rate as required by the dimensions of sensor 10. Spring ring 82 may be of such material and/or be heat treated so as to maintain the desired force throughout the service life of sensor 10.

As to the size and shape of spring ring 82, as shown in FIG. 2, closure flange 80 is sized to extend radially-inwardly of the annular mounting shoulder 76 into the center of well 72. The spring ring 82 is thus configured in size (diameter) to be received in the well 72 (i.e., a diameter no larger than that of well 72) but having an axial extent great enough to ensure that it is sandwiched in compression between the bottom surface of closure flange 80 and insulating substrate 38.

The inventive approach described herein for holding sensing electrode body 18 in place provides a robust structure configured to endure for the service life of sensor 10. Conventionally used components for performing the same function, such as resilient plastic ribs or rubber parts, can deteriorate over time and lose their ability to urge one part against another, as intended, thus resulting in deteriorated performance of the sensor in which it is included.

Figure 11:
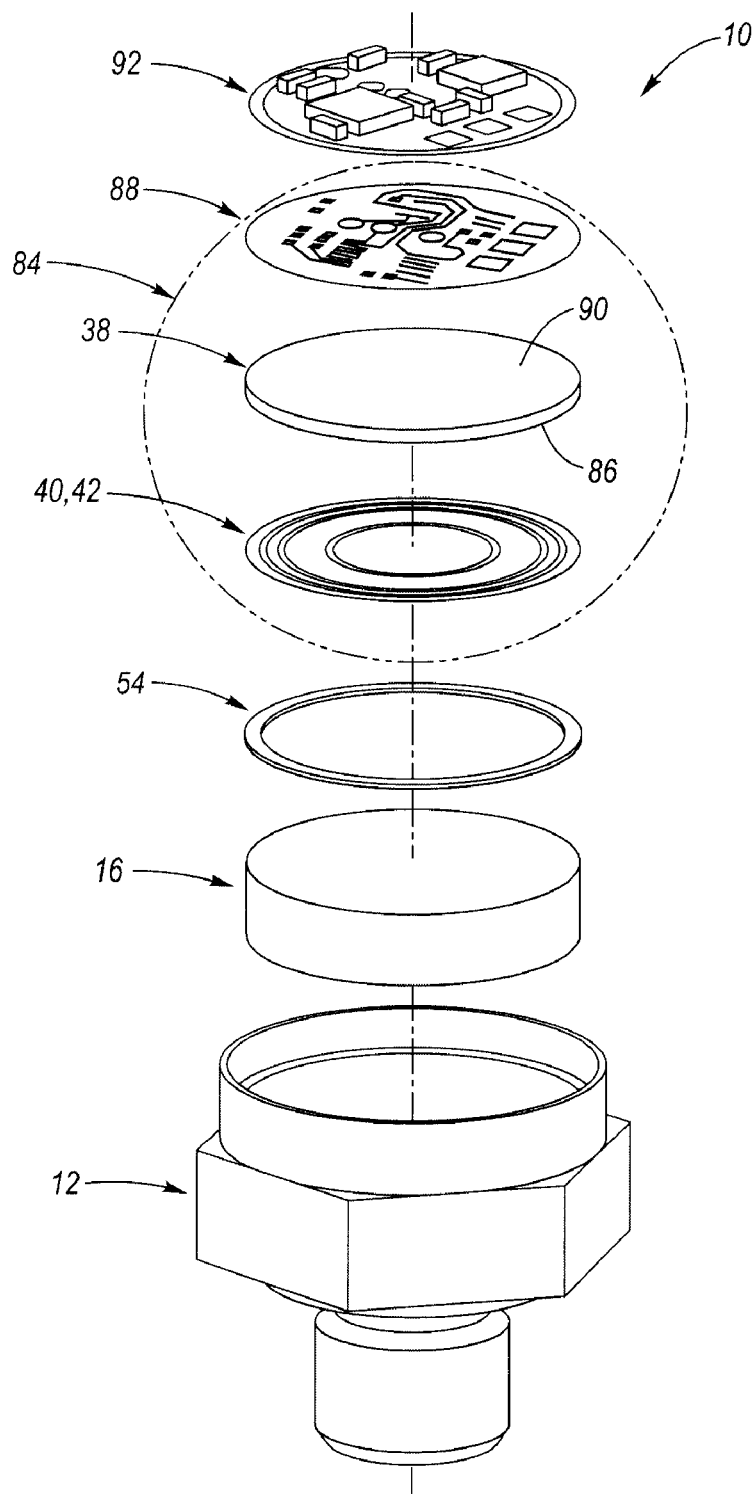
FIG. 11 is an exploded view showing, in greater detail, the inclusion of an integrated hybrid circuit feature of the present invention.

FIG. 11 is an exploded view of sensor 10 showing, in greater detail, still another feature of the present invention, namely, the inclusion of a hybrid circuit. Specifically, in this aspect, pressure signal generating circuit 20 is fabricated as a hybrid circuit, shown enclosed in a dashed-line box designated 84 in FIG. 11. Hybrid circuit 84 provides an efficient mechanism to integrate the electronics, for example circuit 20, used in the capacitive pressure sensor 10 and the sensing electrode body 18, and onto which components and electrical interconnections can be made.

Hybrid circuit 84 includes center and ring electrodes 40, 42, which are formed on a first side 86 of the insulating (i.e., ceramic) substrate 38. Side 86 is the "bottom" side of substrate 38 in the orientation of FIG. 11. Hybrid circuit 84 further includes circuit interconnections similar to and herein referred to as a printed circuit board (PCB) 88 formed on a second, opposing side 90 of the substrate 38. Side 90 is the "top" side in FIG. 11. The hybrid circuit 84 still further includes a variety of electronic components 92 mounted to PCB 88. Finally, hybrid circuit 84 includes vias (i.e., through connections, not shown, made between sides 86, 90 of substrate 38) to allow for the connections of center and ring electrodes 40, 42 to PCB 88.

Preferably, hybrid circuit 84 is implemented on ceramic substrate 38 using thick film technology. For example, center and ring electrodes 40, 42 may be printed on side 86 using conductive inks, while PCB 88 can be printed, also using conductive inks, on the other side 90. Hybrid circuit 84 may also include interconnections printed as multilayer circuits to accommodate complex connections of circuits, small component footprints, and interconnections between multilayer circuits on both sides of substrate 38 using vias. Additionally, ceramic substrate 38 can be easily chapped to accommodate the design requirements, for example, such as a round shaped board in sensor 10.

Hybrid circuit 84 provides the advantage of leveraging existing circuit designs, component selections, etc. and straightforwardly implementing the same directly on the ceramic substrate 38 without the need for a separate board, lead frames or the like as used in conventional approaches. Hybrid circuit 84 also has the advantage of supporting the use of Flip Chip Package Technology for the electronics, which can help optimize real estate (area) usage and/or component placement. Moreover, hybrid circuit 84 also allows the circuitry to be placed closer to sensing electrodes 40, 42, which decreases noise and signal losses, thereby improving signal to noise ratio, improving sensitivity to measure capacitance and smaller parasitics that affect the performance of the circuit over temperature changes.

The foregoing implementation processes (e.g., printing conductive inks, electronic component placement and mounting, etc.) may be implemented using conventional processes known to those of ordinary skill in the art.

Figure 12:
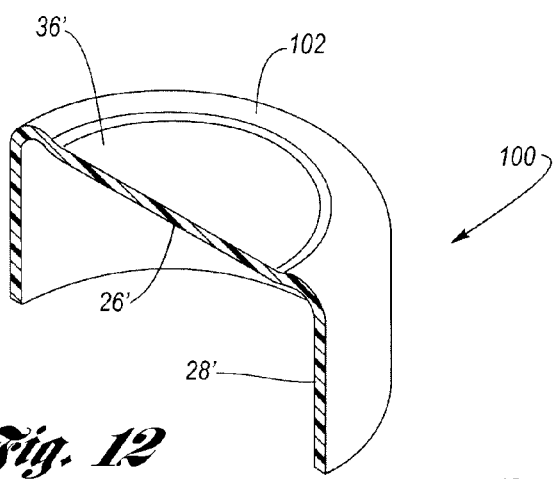
FIGS. 12-13 are cross-section views of an alternate, sheet metal cup embodiment of a diaphragm portion of the sensor.

FIG. 12 is cross-section view of an alternate embodiment of diaphragm 16 comprising a sheet metal cup 100. Due to design and functionality requirements of any particular contemplated use, this alternate embodiment achieves many benefits over conventional approaches. These benefits include generally greater versatility, flexibility, equal to or greater deflection range (depending on pressure ranges) as compared to a machined diaphragm, greater ease in integration into a sensor assembly and finally increased simplicity in manufacturing.

Specifically, a diaphragm in the form of a sheet metal cup 100 has the following advantages: (1) an increased diaphragm deflection (depending on the pressure range being measured) due to generally thinner wall construction; (2) allows for the usage of more ductile and softer materials, which eases manufacturing and thus lowers the cost of manufacturing as compared to machined diaphragm; (3) provides a reduced level of eccentricity and related problems; and (4) reduces or eliminates secondary machining procedures.

With continued reference to FIG. 12, diaphragm 100 includes a base wall 26' which extends into a cylindrical, closed sidewall 28'. Base wall 26' includes a sensing surface 36'. The sensing surface 36' acts as the counterpart electrode for center and ring electrodes 40 and 42 in the same manner as described above for diaphragm 16. In general, diaphragm 100 functions in the same way as machined diaphragm 16 unless otherwise indicated. In this regard, to accomplish the spacing function of spacer 44, diaphragm 100 includes a truncated, toroid shaped land 102 integrally formed as part of diaphragm 100 where land 102 defines a transition region between sidewall 28' and base wall 26'. Land 102 extends fully circumferentially around the perimeter of diaphragm 100, and also provides a stress relief function (during deflection) in addition to the spacing function. Diaphragm 100 may be made using conventional approaches for forming sheet metal (e.g., drawn). As with diaphragm 16, diaphragm 100 is made from conventional sheet metals and is thus electrically conductive. Diaphragm 100 is electrically connected to circuit 20 to measure capacitance, as described above.

Figure 13:
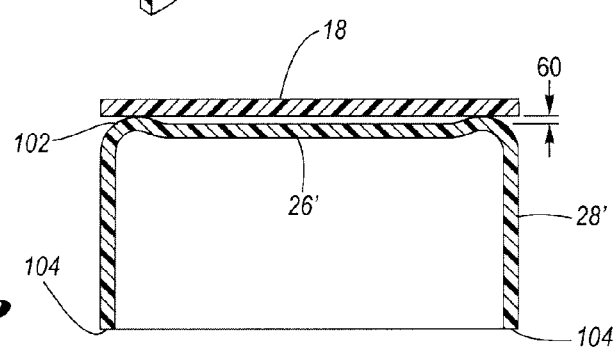

FIG. 13 is a further cross-sectional view of diaphragm 100 shown with sensing electrode body 18 in surface-to-surface contact. Land 102 is offset from sensing surface 36' in order to form air gap 46 wherein electrodes 40, 42 on the bottom side of sensing electrode body 18 is offset by distance 60. Diaphragm 100 includes a circumferentially extending bottom edge 104.

Figure 14A:
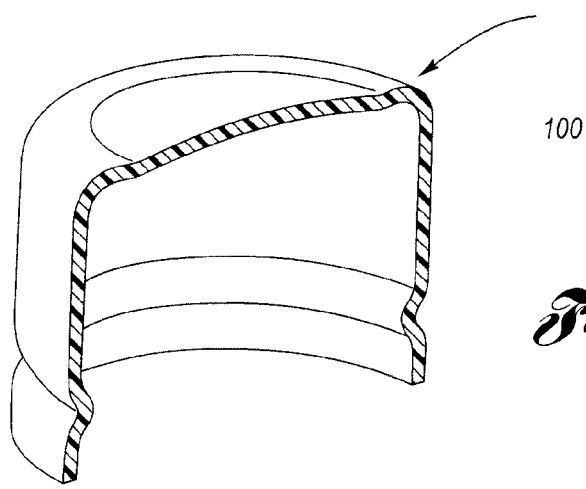
FIGS. 14A-14B are further cross-section views of the sheet metal cup embodiment of FIGS. 12-13, showing a deflection as per an applied pressure.
Figure 14B:
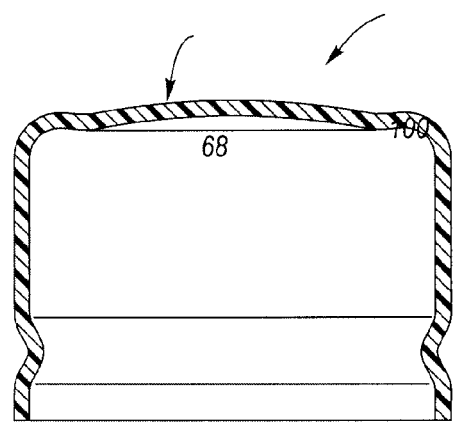

FIGS. 14A-14B illustrate diaphragm 100 under pressure and in deflection. When diaphragm 100 is exposed to pneumatic or hydraulic pressure, in the same manner as described above for diaphragm 16, base wall 26' deflects in a generally vertical direction, as illustrated more particularly in FIG. 14B as deflection 68. This deflection 68 also takes the form of a dome shape, just as in diaphragm 16. This elastic deformation will alter the spacing between center electrode 40 and sensing surface 36', thereby altering the capacitance of the first capacitor 48, just as described above. To a lesser extent, the capacitance associated with ring electrode 42/sensing surface 36' may also change slightly. Again, as described above, the differential capacitance is determined by circuit 20 and a pressure signal 52 is generated indicative of the applied pressure.

In order to obtain the maximum diaphragm performance (maximum deflection and minimum stress ratio) there are some important considerations that are taken in account for the design: media compatibility, pressure range, material selection properties and geometry.

The deformation of diaphragm 100 is designed to behave according to the specific requirements of any desired particular use, such as the desired working pressure range, overpressure requirements and media compatibility. These requirements may be achieved by material properties selection and geometry configuration. Diaphragm 100 for any particular constructed embodiment may be designed based on finite element analysis (FEA) under stress/deflection criteria, as shown in FIGS. 15 and 16.

Figure 15:
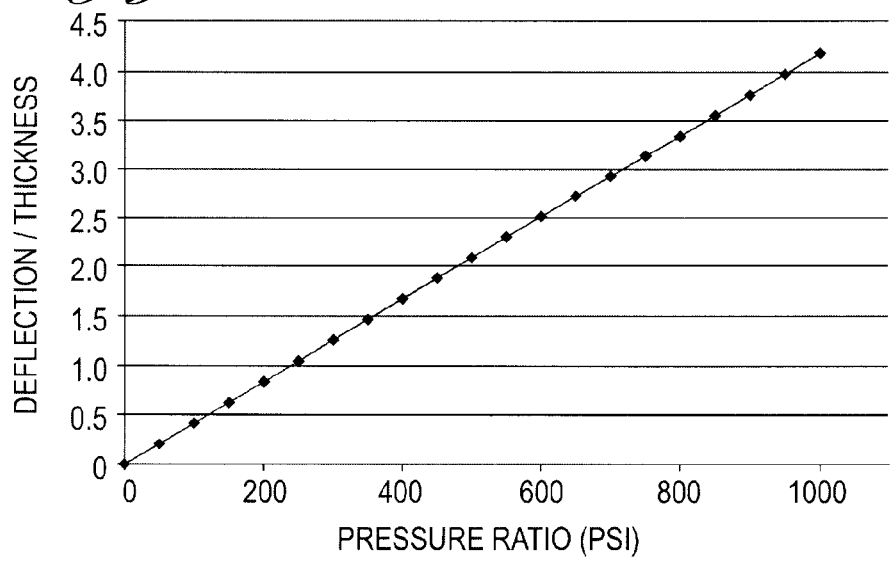
FIG. 15 is a deflection ratio versus pressure diagram for the embodiment of FIGS. 12-14B.

FIG. 15 is a deflection ratio versus pressure diagram for a particular embodiment of the invention.

Figure 16:
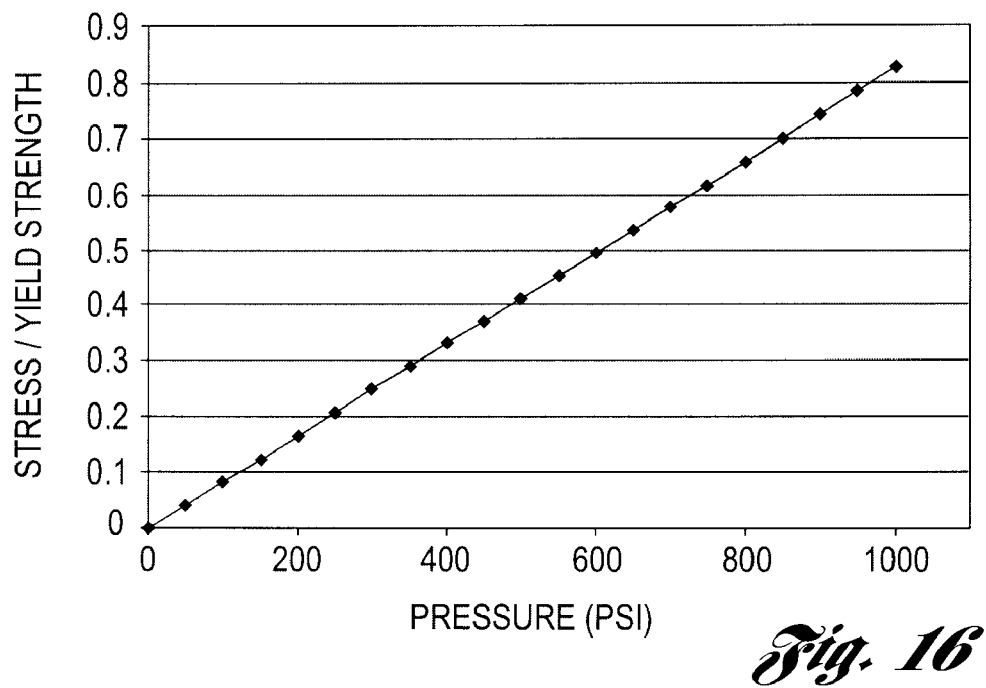
FIG. 16 is a stress ratio versus pressure diagram for the embodiment of FIGS. 12-14B.

FIG. 16 is a stress ratio versus pressure diagram for a particular embodiment of the invention.

Figure 17B:
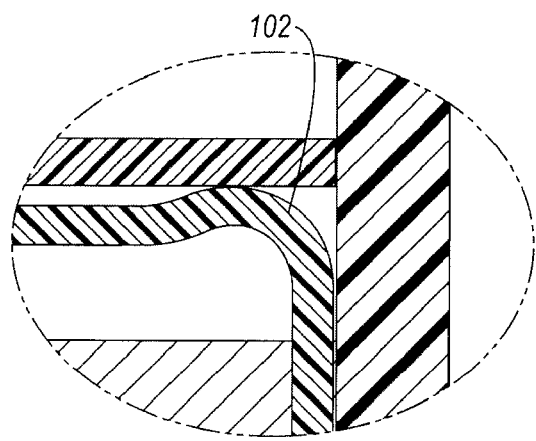
FIG. 17B shows, in greater detail, an elevated land feature of the sheet metal cup diaphragm of FIG. 17A used as a spacer.
Figure 17C:
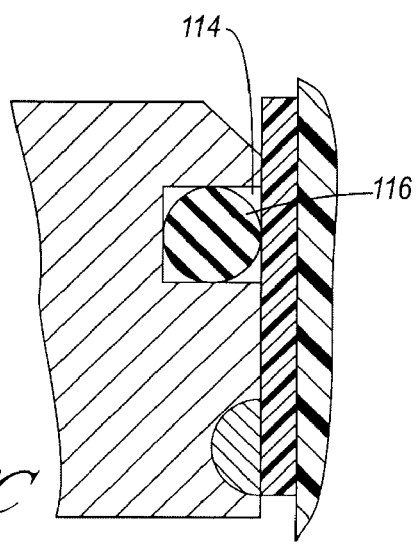
FIG. 17C shows, in greater detail, an attachment mechanism for attaching the sheet metal cup diaphragm of FIG. 17A to a sleeve.
Figure 17A:
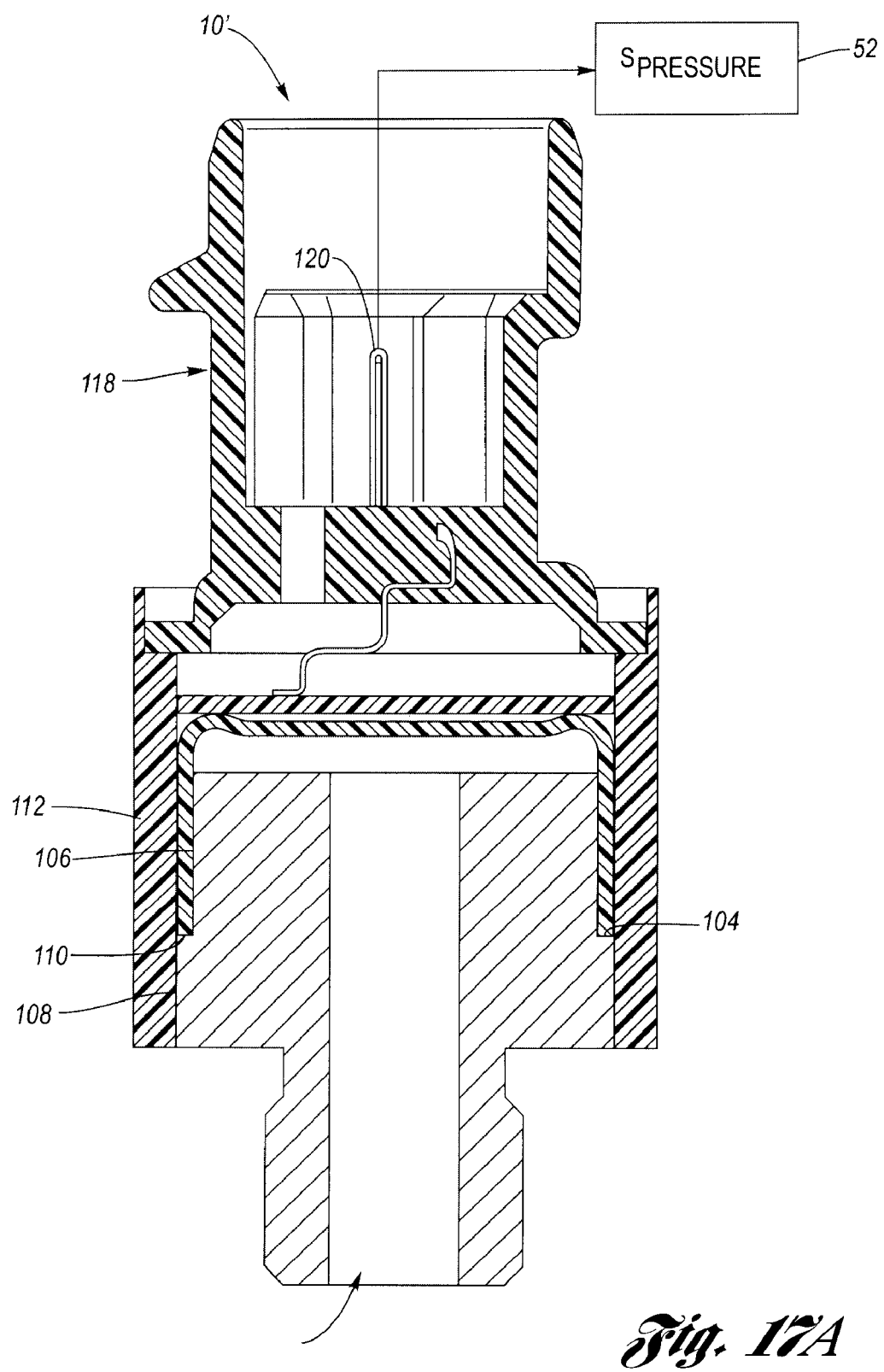
FIG. 17A is a cross-sectional view of an assembled sensor employing the sheet metal cup diaphragm of FIGS. 12-14B.

FIG. 17A is a cross-sectional view showing a sensor 10' employing a sheet metal cup 100 as the diaphragm member. Certain changes to the overall configuration are illustrated for sensor 10'. Base-port 12 is shown having a first outside diameter surface 106, a second outside diameter surface 108 larger than the first outside diameter surface, and an annular shoulder 110 located between the first and second outside diameter surfaces. The sheet metal cup diaphragm 100 is configured in size and shape such that when assembled, the bottom, free edge 104 of the circular sidewall engages and is seated on the annular shoulder 110. When installed, an inside diameter surface of sheet metal cup diaphragm 100 engages the first outside diameter surface 106 of base-port 12.

FIG. 17A further shows a joining sleeve 112. In one embodiment, sleeve 112 includes threads on an inside surface. The second outside diameter surface 108 of base-port 12 also includes threads that are in mesh with the sleeve threads to thereby fix the sleeve 112 to the base port 12.

FIG. 17B shows, in greater detail, toroid shaped land 102. As described above, land 102 not only provides the spacing function but also a stress relief function when diaphragm 100 is under pressure.

FIG. 17C shows, in greater detail, one embodiment of an attachment approach for securing sheet metal cup diaphragm 100 to base-port 12. For example, the bottom free edge 104 of sheet metal cup diaphragm 100 may be roll crimped, welded or press-fit to base-port 12. In any of these embodiments, for sealing purposes, base-port 12 includes a circumferentially-extending slot 114 disposed in first outside diameter surface 106. The slot 114 is configured to receive an O-ring 116 or the like. The O-ring 116 is configured to engage and seal to the inside diameter surface of sheet metal cup diaphragm 100.

Finally, with continued reference to FIG. 17A, sensor 10' further includes a connector assembly 118 configured for connection to joining sleeve 112 (e.g., press-fit, threads, etc). The connector assembly 118 includes electrical conductors for providing electrical connections to the pressure signal generating circuit 20. Circuit 20, as described above, is configured to generate pressure signal 52 ($S_{PRESSURE}$) indicative of the applied pressure.

Unless otherwise indicated, sensor 10' may be constructed and operates in the same manner as sensor 10.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A pressure sensor, comprising:
a base-port having an opening configured to receive a fluid having a pressure;
a transducer including
(i) an electrically conductive diaphragm having a base wall extending into a cylindrical, closed side wall to thereby define an interior, said diaphragm being arranged relative to said base-port such that said interior is in communication with said fluid opening thereby forming a fluid pressure cavity, said diaphragm being substantially U-shaped in cross-section, said base wall of said diaphragm having a working surface facing said fluid pressure cavity and an opposing sensing surface; and
(ii) a sensing electrode body including an insulating substrate having center and ring electrodes facing toward and spaced apart from said sensing surface by a spacer to form an air gap therebetween, said center electrode and said sensing surface forming a first capacitor and said ring electrode and said sensing surface forming a second capacitor;
a pressure signal generating circuit responsive to variations in capacitance of said first and second capacitors configured to generate a pressure signal indicative of said fluid pressure.

2. The sensor of claim 1 wherein said spacer comprises a step ring intermediate said diaphragm and said insulating substrate, said step ring being configured in size and shape to overlay a radially-outermost perimeter surface of said diaphragm.

3. The sensor of claim 1 wherein said spacer comprises a step integrally formed in said diaphragm, said step being offset from said sensing surface by a predetermined distance, said step being configured to occupy a radially-outermost perimeter of said diaphragm.

4. The sensor of claim 1 wherein said center electrode has a first area and said ring electrode has a second area, said first and second areas being substantially equal.

5. The sensor of claim 4 wherein said sensing surface in response to pressure variation in said fluid pressure cavity is configured to flex so as to alter said gap between said sensing surface and said center electrode and thereby vary said first capacitance.

6. The sensor of claim 5 wherein said pressure signal generating circuit is electrically connected to said center and ring electrodes and is configured to determine the respective capacitances of said first and second capacitors in a differential mode.

7. The sensor of claim 6 wherein said circuit includes a half-bridge arrangement for connecting said first and second capacitors in said differential mode.

8. The sensor of claim 1 wherein said substrate comprises ceramic material.

9. The sensor of claim 1 wherein said substrate includes vias therethrough configured to permit electrical connections between said center and ring electrodes and said pressure signal generating circuit.

10. The sensor of claim 1 wherein said gap includes dielectric material.

11. The sensor of claim 1 wherein said base-port includes a well in fluid communication with said opening, said well being configured to receive said transducer, said base-port having a mouth axially opposite said opening, said base-port further including an annular mounting shoulder proximate said well wherein said sensor further includes a housing and connector assembly having a closure flange configured in size and shape to pass through said mouth of said base-port and engage said mounting shoulder.

12. The sensor of claim 11 wherein said base-port, said diaphragm, said electrode body and said housing and connector assembly are arranged concentrically about a longitudinal axis.

13. The sensor of claim 12 wherein said housing and connector assembly is press fit into said base-port.

14. The sensor of claim 11 wherein said closure flange has an extent configured to extend radially-inwardly of said annular mounting shoulder into said well, said sensor further comprising a spring ring configured in size to be received in said well and being further configured to have an axial extent so as to be sandwiched between said closure flange and said transducer.

15. The sensor of claim 14 wherein said spring ring has a spring rate sufficient to maintain said substrate positioned against said spacer.

16. The sensor of claim 1 wherein said pressure signal generating circuit is fabricated as a hybrid circuit.

17. The sensor of claim 1 wherein said substrate comprises ceramic material, said center and ring electrodes being printed on a first side of said substrate, circuit interconnections defining a printed circuit board (PCB) being printed on a second, opposing side of said substrate, electronic components being mounted to said PCB, said substrate further including vias therethrough configured for connecting said center and ring electrodes to said PCB.

18. The sensor of claim 1 wherein said diaphragm comprises a sheet metal cup, wherein said spacer comprises a truncated toroid shaped land integrally formed as part of said cup, said land defining a transition between said sidewall and said base wall, said land being offset from said sensing surface.

19. The sensor of claim 18 wherein said base-port has a longitudinal axis associated therewith, said base-port having a first outside diameter surface, a second outside diameter surface larger than said first outside diameter surface, and an annular shoulder disposed between said first and second outside diameter surfaces wherein said sheet metal cup is configured in size and shape such that a free, bottom edge of said circular sidewall engages said annular shoulder and wherein an inside diameter surface of said cup engages said first outside diameter surface of said base-port.

20. The sensor of claim 19 wherein said second outside diameter surface includes threads, said sensor further including a sleeve having threads on an inside surface thereof in mesh with said threads on said second outside diameter surface to thereby fix said base-port to said sleeve.

21. The sensor of claim 19 wherein said base port includes a circumferentially-extending slot disposed in said first outside diameter surface, said sensor further including an O-ring disposed in said slot and configured to engage said inside diameter surface of said cup.

22. The sensor of claim 19 wherein said free edge of said cup sidewall is welded to said base-port.

23. The sensor of claim 19 wherein said cup is press fit over said first outside diameter surface of said base-port.

24. The sensor of claim 19 wherein said free edge of said cup sidewall is roll crimped to said base-port.

25. The sensor of claim 20 further including a connector assembly configured for connection to said sleeve, said connector assembly including conductor for providing electrical connections to said pressure signal generating circuit.

* * * * *